(12) United States Patent
Gupta

(10) Patent No.: US 6,836,544 B1
(45) Date of Patent: Dec. 28, 2004

(54) SIDESTONE REDUCTION IN FULL DUPLEX TRANSCEIVERS

(75) Inventor: Sandeep K. Gupta, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 09/645,688

(22) Filed: Aug. 24, 2000

(51) Int. Cl.[7] ............................ H04M 3/00; H04M 1/00
(52) U.S. Cl. .................. 379/391; 379/392; 379/406.01; 379/392.01; 379/390; 379/406.15; 379/406.02; 370/276
(58) Field of Search ................................. 379/391, 392

(56) References Cited

U.S. PATENT DOCUMENTS

| | | | | |
|---|---|---|---|---|
| 3,602,648 A | * | 8/1971 | Holtz | |
| 4,002,857 A | * | 1/1977 | Herlacher | |
| 4,236,048 A | * | 11/1980 | Olney | |
| 4,807,225 A | * | 2/1989 | Fitch | |
| 5,333,176 A | * | 7/1994 | Burke et al. | |
| 5,396,549 A | * | 3/1995 | Mulder et al. | 379/391 |
| 5,533,119 A | * | 7/1996 | Adair et al. | 379/391 |
| 6,400,772 B1 | * | 6/2002 | Chaplik | 379/391 |
| 6,417,687 B1 | * | 7/2002 | Heinrich | 326/21 |

OTHER PUBLICATIONS

Allstot et al "An Electrically–Programmable Switched Capacitor Filter", IEEE Journal of Solid–State Circuits, vol. SC –14 No. 6, Dec. 1979, pp. 1034–1041.*

* cited by examiner

Primary Examiner—Forester W. Isen
Assistant Examiner—Ramnandan Singh
(74) Attorney, Agent, or Firm—Trop, Pruner & Hu, P.C.

(57) ABSTRACT

A method and apparatus enables echo reduction in a full duplex transceiver system. A replica current is subtracted from a receiver via a first differential circuit path that adaptively matches a time constant associated with a second differential circuit path that connects the receiver with an external data line.

19 Claims, 6 Drawing Sheets

SIDESTONE REDUCTION IN FULL DUPLEX TRANSCEIVERS

BACKGROUND OF THE INVENTION

1. Field of the Invention

The described invention relates to the field of communications. In particular, the invention relates to a method and apparatus for reducing echo in a full duplex transceiver system.

2. Description of Related Art

In a full duplex transceiver system, the output of the transmitter and the input of the receiver share the same path for connecting to an external data line. The transmitter's transmission is thus received at the input of the receiver producing an "echo", and a way of reducing this echo is employed so as not to interfere with the correct reception of signals by the receiver.

Various digital subscriber lines (DSL) as well as some Ethernet lines support full duplex transceiver systems. For example, the Gigabit Ethernet (IEEE specification 802.3) supports a full duplex transceiver system, and the 10 Gigabit Ethernet specification, although not yet adopted, is also likely to support a full duplex transceiver system.

One prior art method of reducing the echo is performed by subtracting a replica current from the receiver, as will be shown with respect to FIG. 1. The replica current is typically a predetermined fraction of the transmitter current.

As shown in FIG. 1, transmitter 19 provides currents +ITX and −ITX on input/output (I/O) lines 10 and 12, respectively. The I/O lines are also coupled to a receiver 20.

FIG. 1 shows only the input stage of the receiver 20, which comprises resistors 22, 24, 46, and 48, capacitors 60 and 62, and an operation amplifier (op amp) 30. Resistors 22 and 24 each have values M*RT and couple the I/O lines 10 and 12 to the op amp 30 via a differential circuit path that carries differential current $I_{FB}$ The inputs of the op amp 32 and 34 are coupled to differential replica current paths 42 and 44 that carry a differential current ITX/N−(−ITX/N)=2 ITX/N.

Two feedback resistors $R_{FB}$ 46 and 48 couple the inputs 32 and 34 of the op amp 30 to its outputs 52 and 54, respectively. Capacitors 60 and 62 also couple the inputs 32 and 34 of the op amp 30 to its outputs 52 and 54.

The transmitter and receiver are generally on the same semiconductor chip and a termination resistor $R_T$ 70 is off-chip to match the impedance of a data line 80 such as a DSL or Gigabit Ethernet line. A transformer 90 couples the data line 80 to the I/O lines 10 and 12. A circuit board is typically used to mount the semiconductor chip, transformer 90, and resistor $R_T$ 70. A center tap 92 of the transformer 90 is coupled to the power supply of the circuit board. This center tap provides the differential current for the transmitter shown as +ITX and −ITX in FIG. 1.

For the circuit shown in FIG. 1, using the condition N=4M+1, it will now be shown that the dc output signal at the op amp output is just equal to the received signal from the external data line:

The transmitter voltage, in the absence of any received signal (i.e., for $V_{RX}=0$), is given by the equations:

$V_{TX}=I_{TX}R_L$, where the load across the transmitter is given by:

$R_L = R_T \| R_0 \| 2MR_T$ $= (2MR_0/4M + 1)$, where $R_T = R_0$.

The differential voltage $V_{MX}$ across the I/O lines 10 and 12 as shown in FIG. 1 is made up of the voltage component contributed by the transmitter and the voltage component contributed by the receiver:

$V_{MX} = V_{TX} + V_{RX}$ $= (2MR_0/4M + 1)I_{TX} + V_{RX}$

The differential current flowing through the resistors M $R_T$ 22 and 24 is given by the equation:

$I_{FB} = V_{MX}/MR_T$ $= (2/(4M + 1))I_{TX} + (V_{RX}/MR_0)$, where $R_T = R_0$.

The differential replica current leaving the receiver through replica current paths 42 and 44 is given by the equation:

$I_{RD}=-2I_{TX}/N$

The output of the op amp 30 is:

$V_{OUT} = [I_{FB} + I_{RD}]R_{FB}$ $= [(2/(4M + 1))I_{TX} - (2/N)I_{TX} + (V_{RX}/MR_0)]R_{FB}$ $= V_{RX}$, where $N = 4M + 1$ and $R_{FB} = MR_0$ Thus, the output of the op amp 30 is just the received signal from the external data line. However, although the above description holds for a dc signal, this may not be the case for all frequencies.

DETAILED DESCRIPTION

Figure 1:
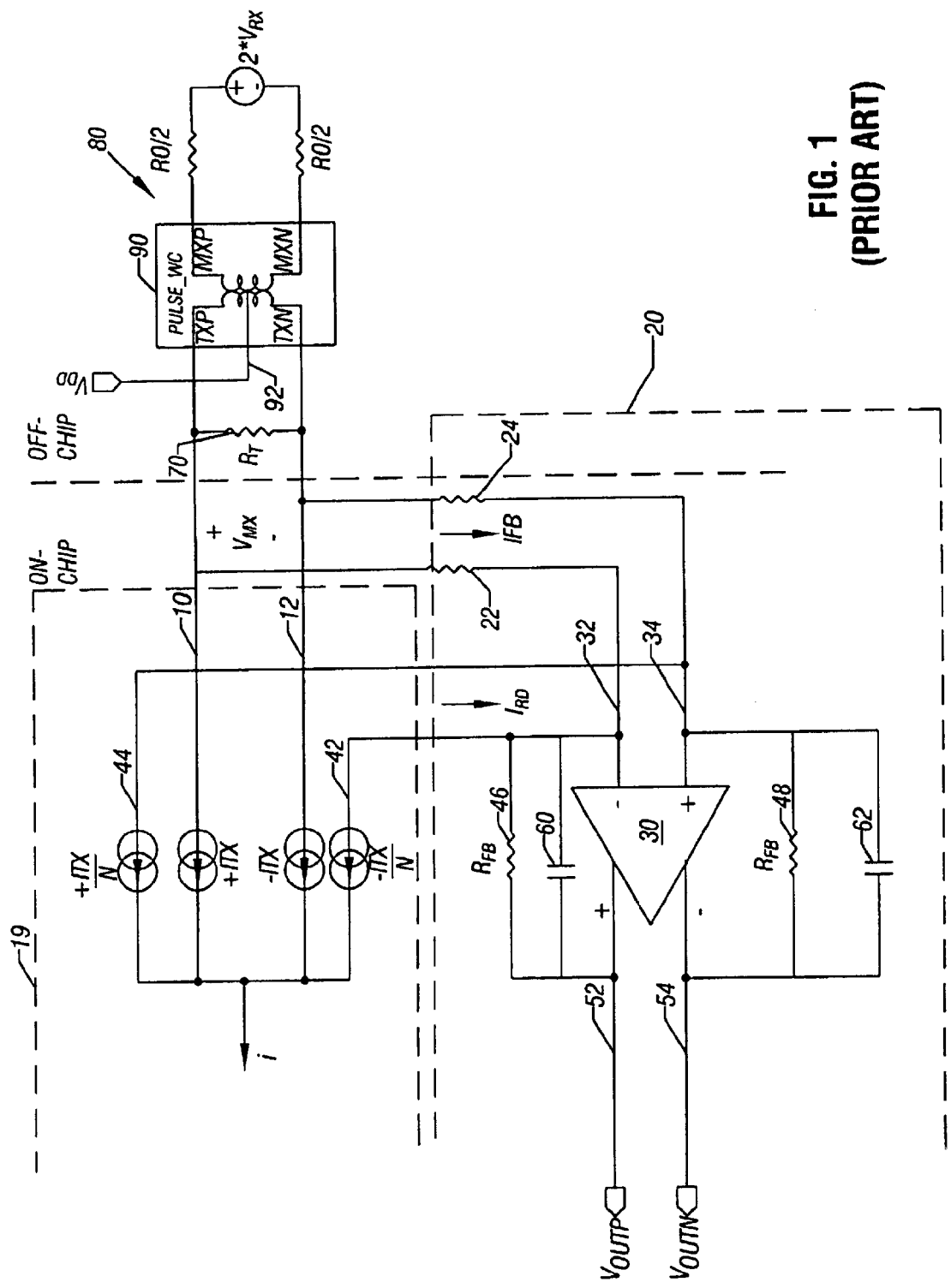
FIG. 1 shows a prior art full duplex transceiver system for reducing echo.
Figure 3:
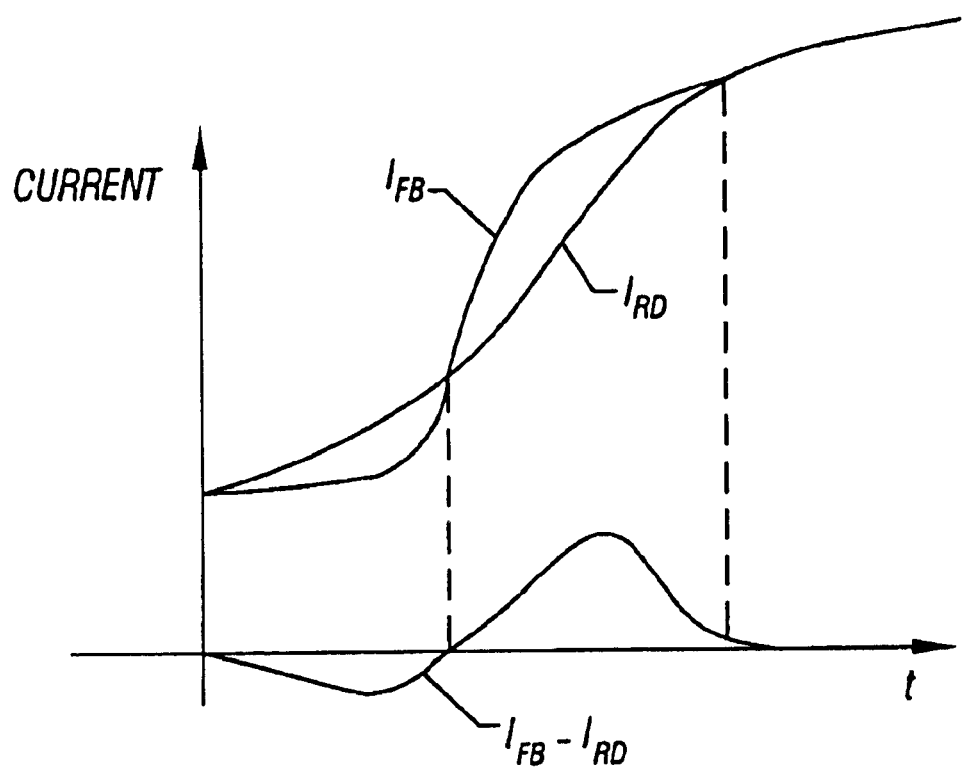
FIG. 3 shows a sample graph of $I_{FB}$ and $I_{RD}$ of FIG. 1.

FIG. 3 shows a sample graph of $I_{FB}$ and $I_{RD}$ of FIG. 1. To arrive at zero output due to the transmitter, the replica current $I_{RD}$ should exactly cancel the transmitter current $I_{FB}$. However, the replica current path starts to look significantly different from the transmitter current path as frequency-dependent parameters (i.e., inductances and capacitances) become significant at high frequencies. In particular, the transmitter current path is influenced by transformer inductance as well as inductances and capacitances from, e.g., the bond wire of the semiconductor package and traces on the circuit board. This causes the slope of $I_{FB}$ to vary from that of $I_{RD}$ for any data symbol transmitted. An uncanceled echo ($I_{FB}-I_{RD}$) results.

Symbols are transmitted using signals of various current levels and durations. The slopes of $I_{FB}$ and $I_{RD}$ can be quite different based on the symbol transmitted. In systems where the output of the op amp 30 is passed to a sampled system with the sampling being done by the timing recovery clock, high frequency echo can potentially cause non-convergence in the timing recovery loop.

Additionally, the absolute magnitude of the echo can lead to higher bit error rates at high line lengths, severely limiting line length performance. Any high magnitude echo reduces the dynamic range of the circuits following it and may lead to noise if not cancelled by subsequent filtering stages, such as by a linear FIR filter stage. Therefore, it is important to reduce the high frequency content and the magnitude to prevent degrading the received-signal-to-noise ratio that may lead to high bit error rates.

Low passing of the output to reduce the echo, such as by increasing the product of MR*Cacross the op amp 30 helps reduce the echo, but the received-signal-to-echo ratio must be maintained, and lowpassing beyond a certain extent can cause proportionally equal or more degradation in the received signal power, depending on the received signal spectrum.

Figure 2:
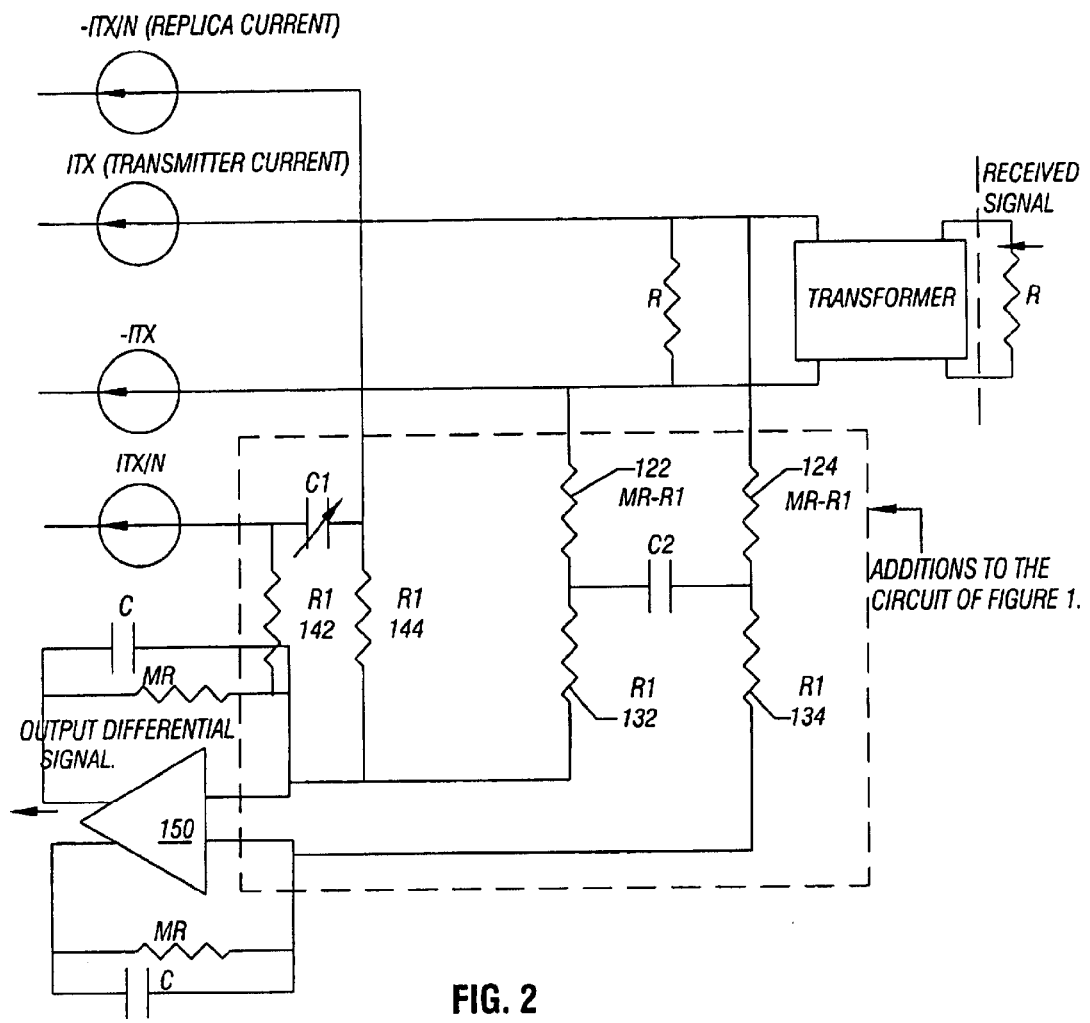
FIG. 2 shows a full duplex transceiver system that includes improvements from the system of FIG. 1.

FIG. 2 shows an improvement over the circuit of FIG. 1 with additional circuitry added in the dashed box. The circuitry outside the dashed box is similar to that described with respect to FIG. 1. The circuit of FIG. 2 can be made to attenuate high frequency content of the echo as well as reduce its magnitude by controlling a variable capacitor. The idea is to introduce a way of adjusting the time constants of the two paths carrying currents $I_{FB}$ and $I_{RD}$.

Resistors 22 and 24 (of FIG. 1) have been modified by circuitry that helps to reduce high frequency echo. In one embodiment, resistors 22 and 24 are replaced by resistors 122 and 124 (respectively) having values M*R−R1 in series with resistors 132 and 134 (respectively) having values R1. A capacitor C2 couples the node between resistors 122 and 132 to the node between resistors 124 and 134.

Resistors 142 and 144 have been placed in the replica current paths for drawing current from the inputs to op amp 150. A capacitor C1 couples the two replica current paths together. In one embodiment, the capacitor C1 is implemented as a variable capacitor, and C2 as fixed. Equivalently, the high frequency echo may also be reduced by implementing C1 as a fixed capacitor and C2 as a variable capacitor.

In one embodiment, the differential circuit path from the op amp p1 50 input through the resistors 132/122 and 134/124 to the transformer is modeled to determine a time constant associated with the differential circuit path ("the echo circuit path").

Figure 4A:
FIG. 4A shows a block diagram of a transformer.
Figure 4B:
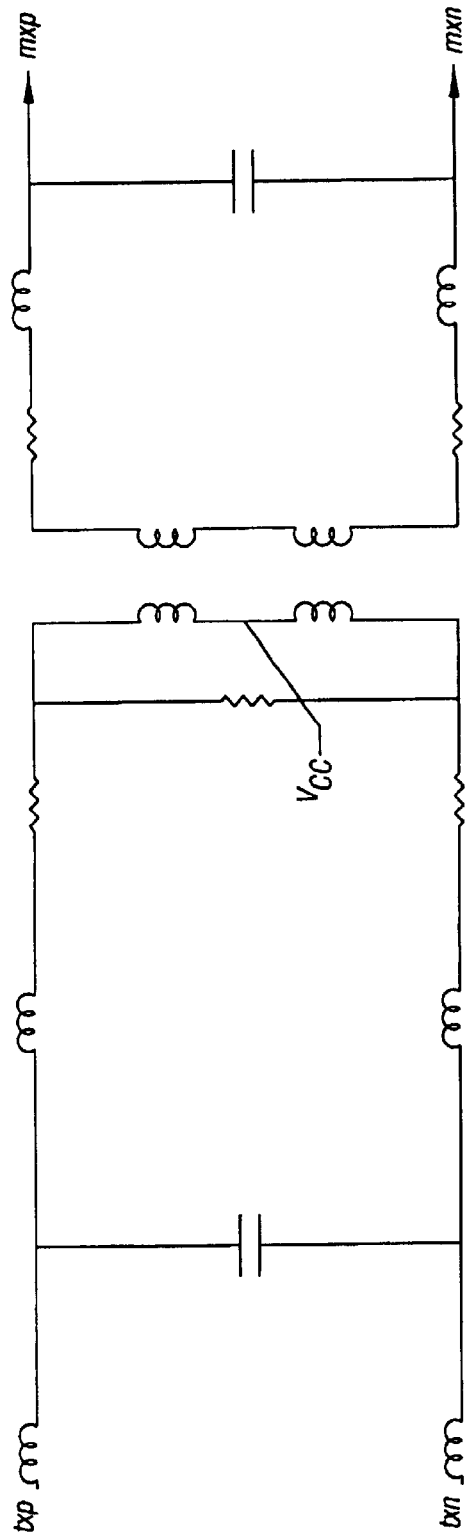
FIG. 4B shows an exemplary model of a transformer including resistive capacitive, and inductive components that make it up.

FIGS. 4A and 4B show an exemplary model of a transformer and the resistive capacitive, and inductive components that make it up. Modelling bond wires and board traces can be used to achieve a more accurate value of a time constant associated with the echo circuit path.

Similarly, the replica current path from the input of the amplifier stage (op amp 150) through the resistors 142 and 144 can be modeled with its resistive and capacitive components to determine a time constant associated with it. By changing the value of the variable capacitor C1, the time constant of the replica current path can be made to match the time constant of the echo circuit path.

In one embodiment, the value of variable capacitor C1 for matching the time constant of the replica current path with the time constant of the echo circuit path is determined by modelling and simulations. However, because of variations due to process and modelling/simulation limitations, variations from the simulated value of variable capacitor C1 may provide better echo reduction. Therefore, the modelling and simulations can be used to determine the approximate range of the value of the variable capacitor, and appropriate adjustment controllably is implemented.

If R1 is set to MR/2, then by changing the ratio C1/C2 for all practical parameters, i.e., leakage inductance and primary and secondary capacitances, the slopes of $I_{FB}$ and $I_{RD}$ can be equalized, or in other words the time constants of the echo path and the replica current path can be substantially matched. Based on extensive testing, the circuit of FIG. 2 was found to be around 8–10 db better in performance than the circuit of FIG. 1; that is around time improvement in the matching of the two time constants. Total peak to peak magnitude of the echo for a random distortion packet was reduced by 35 db with respect to the transmitted symbols.

Figure 5:
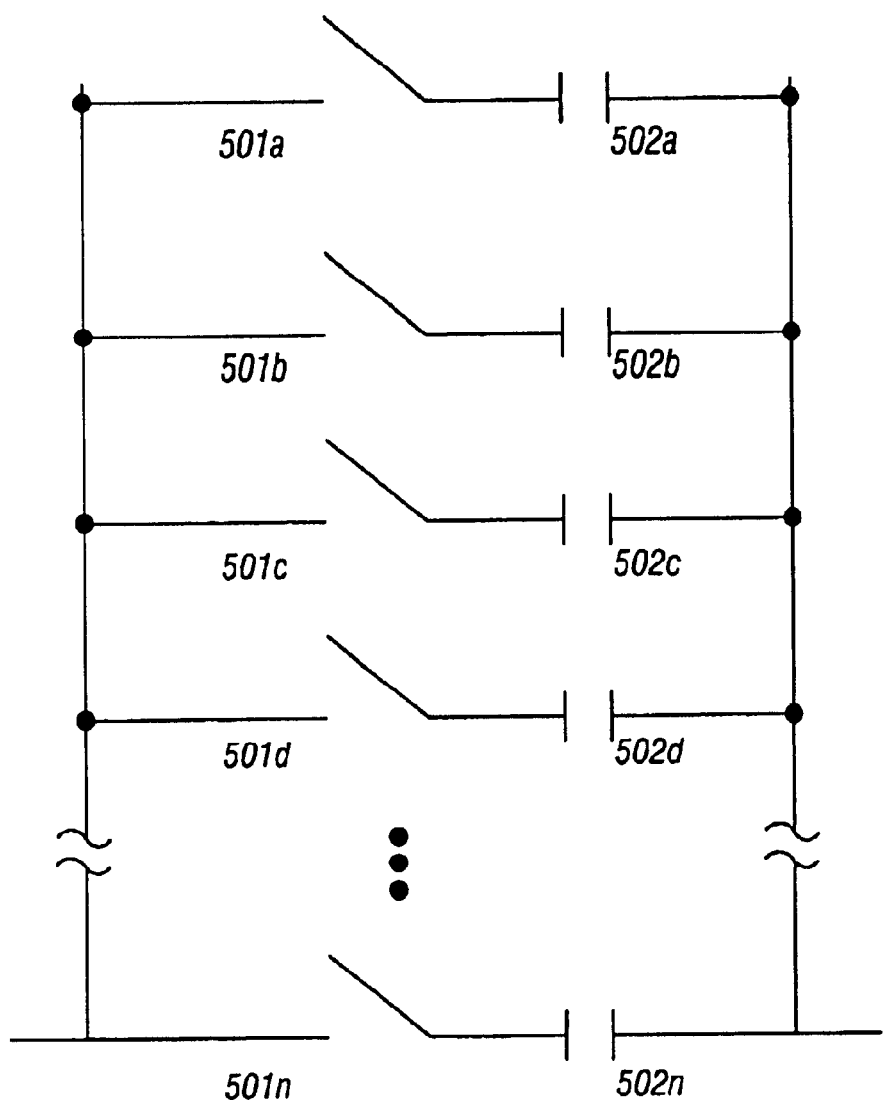
FIG. 5 shows one embodiment of variable capacitor C1.

FIG. 5 shows one embodiment of variable capacitor C1. In one embodiment, variable capacitor C1 comprises individual capacitors that may be enabled in parallel. Each individual capacitor 502a–n may be enabled or disabled by a gate 501a–n. In one embodiment, the variable capacitor C1 is adjusted by programming bits in a register, based on the particular transformer and board traces. The variable capacitor C1 can also be controlled by a digital signal processor (DSP) engine where the value of the capacitor can be adjusted in steps of reasonable accuracy.

In one embodiment, the values of R1, C1 and C2, M and N, are chosen based on the following guidelines:

(i) The extent to which lowpassing of the replica current path and the transmitter current path is based on the product of R1 *C2 as well as R1 *C1. Neither product can be raised beyond a certain value since it would attenuate the received signal. This, therefore, limits the amount of echo reduction which can be obtained by continuing to lowpass the two paths;

(ii) R1*C1 cannot be made too small because it is difficult to match two waveforms with steep slopes; and (iii) The value M is based on the equation N=4M+1, where N is chosen large enough to reduce the power dissipation of the transmitter on chip.

Figure 6:
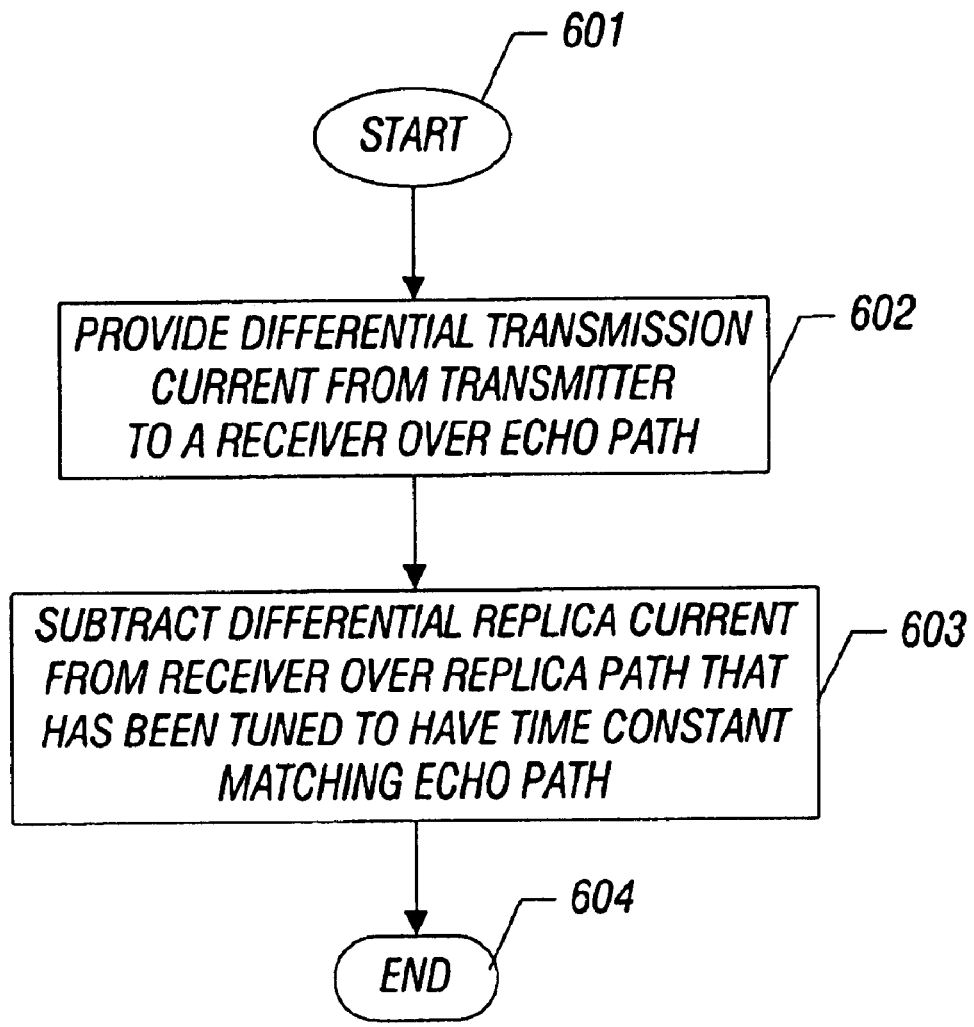
FIG. 6 shows a flowchart of the process for reducing echo in a full duplex system.

FIG. 6 shows a flowchart of the process for reducing echo in a full duplex system. The flowchart starts at block 601 and proceeds to block 602, at which differential transmission current is provided from the transmitter to a receiver over an echo path. In one embodiment, the echo path is affected by not only resistances and capacitances on-chip but also resistances, capacitances, and inductances from components off-chip.

The flowchart proceeds at block 603 at which a differential replica current is subtracted from the receiver over a replica path that has been tuned to have a time constant matching a time constant of the echo path. The flowchart ends at block 604.

Thus, a method and apparatus for reducing an echo of a full duplex transceiver system is disclosed. However, the specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A transceiver comprising:
   a transformer;
   a transmitter coupled to provide a differential transmission current to the transformer;
   a receiver coupled to receive a first differential current via a first differential circuit path, the receiver coupled to provide a differential replica current over a second differential circuit path, wherein the differential replica current corresponds to a fraction of the differential transmission current; and
   a variable capacitor to couple the two replica current paths of the differential replica current.

2. The transceiver of claim 1, wherein the second differential circuit path comprises a variable capacitor.

3. The transceiver of claim 1 wherein the first differential circuit path and the second differential circuit path each have an associated time constant, and the time constant of the first differential circuit path substantially matches the time constant of the second differential circuit path.

4. The transceiver of claim 3, wherein the time constant of the first and the time constant of the second differential circuit paths are based upon resistances and capacitances on an integrated circuit comprising the transceiver, and the first differential circuit path is additionally based on resistances, capacitances and inductances due to components external to the integrated circuit.

5. The transceiver of claim 4, wherein the time constant of the first differential circuit path is additionally based on inductances due to bond wires, lead frames, and circuit board traces.

6. A transceiver comprising:
   a transformer having two input lines and a center tap;
   a transmitter coupled to the two input lines of the transformer, the transmitter coupled to transmit a signal by providing a transmitter current on the two input lines of the transformer;
   a receiver coupled to the two input lines of the transformer, the receiver having two amplifier inputs, each of the two amplifier inputs being coupled to one of the two input lines of the transformer via a pair of resistors in series, wherein nodes between each of the pair of resistors in series are coupled together with a first capacitor; and
   two replica current paths coupled to subtract a portion of the transmitter current from the two amplifier inputs, wherein each of the two replica current paths include an in-series resistive component, and a second capacitor couples the two replica current paths with each other.

7. The transceiver of claim 6, wherein the first capacitor is electrically programmable.

8. A method comprising:
   providing a differential transmission current from a transmitter to a receiver over a first differential circuit path; and
   tuning an R-C time constant of a differential replica current path that subtracts a predetermined fraction of the differential transmission current from the receiver to substantially match a time constant associated with the first differential circuit path.

9. The method of claim 8, wherein tuning the R-C time constant is based on modeling resistances, capacitances and inductance from off-chip.

10. A method comprising:
    providing a differential transmitter current from a transmitter;
    receiving a portion of the differential transmitter current at a receiver input via a first differential circuit path;
    subtracting a differential replica current from the receiver input using a second differential circuit path, wherein the first differential circuit path and the second differential circuit path have been capacitively tuned for sidetone reduction based on frequency-dependent parameters of a full duplex system; and
    capacitively coupling the two replica current paths of the differential replica current.

11. The method of claim 10, wherein the differential replica current corresponds to a fraction of the differential transmitter current.

12. A method comprising:
    receiving a first differential current via a first differential circuit path;
    providing a differential replica current over a second differential circuit path;
    adjusting a time constant of the first differential circuit path and a time constant of the second differential circuit path to substantially match the first and second time constants; and
    capacitively couple the two replica current paths of the differential replica current.

13. The method of claim 12, further comprising:
    controlling a variable capacitor on the second differential circuit path to adaptively match the first and second time constants.

14. The method of claim 12, further comprising:
    substracting a predetermined fraction of the first differential current from a receiver.

15. A method comprising:
    providing a transmitter current on two input lines of a transformer for two amplifier inputs;
    coupling each of two amplifier inputs to one of the two input lines of the transformer;
    substracting a portion of the transmitter current from the two amplifier inputs via two replica current paths; and
    capacitively coupling the two replica current paths of the differential replica current.

16. A transceiver comprising:
    a receiver;
    a transmitter coupled to provide a differential transmission current from said transmitter to said receiver over a first differential circuit path;
    a circuit to tune an R-C time constant of a differential replica current path that subtracts a predetermined fraction of the differential transmission current from said receiver to substantially match a time constant associated with the first differential circuit path; and
    a variable capacitor that couples the two replica current paths of the differential replica current.

17. The transceiver of claim 16, wherein tuning the R-C time constant is based on modeling resistances, capacitances and inductance from off-chip.

18. A transceiver comprising:

a transmitter to provide a differential transmitter current;

a receiver coupled to receive a portion of the differential transmitter current at a receiver input via a first differential circuit path;

a circuit to subtract a differential replica current from the receiver input using a second differential path, wherein the first differential circuit path and the second differential circuit path have been capacitively tuned for sidetone reduction based on frequency-dependent parameters of a full duplex system; and a variable capacitor to couple the two replica current paths of the differential replica current.

19. The transceiver of claim 18, wherein the differential replica current corresponds to a fraction of the differential transmitter current.

* * * * *